Patented Aug. 10, 1954

2,686,119

UNITED STATES PATENT OFFICE 2,686,119

PROTECTION OF PAPER STOCK AGAINST SLIME

Stanley J. Buckman and Robert N. Meals, Memphis, Tenn., assignors to Buckman Laboratories, Inc., Memphis, Tenn., a corporation of Tennessee No Drawing. Application February 9, 1950, Serial No. 143,338

10 Claims. (Cl. 92—3)

This invention is a continuation-in-part of an application entitled Protection of Paper Stock Against Slime, Serial No. 696,348, filed September 11, 1946, and relates to the preservation of wood pulp, wool felts, starch and protein sizing, coating and adhesive materials, vegetable tanning liquors, hides and the like against bacteria, molds, yeasts, and other microorganisms and to the control of microorganisms in industrial water supplies. It is particularly directed to new and useful processes and compositions of matter whereby the microorganisms are controlled with a mixture of an aromatic organic mercury compound of the type RHgX and one or more compounds selected from the class consisting of the isomeric trichlorophenols and their salts.

Wood pulp, starch and protein materials, vegetable tanning liquors, hides and the like are damaged by the growth of microorganisms which render them difficult and expensive to process and which are likely to degrade or render them unsuitable for use. The growth of microorganisms in industrial water supplies creates problems in the form of accumulations in basins, spray ponds, and cooling towers, and forms films on condenser tubes which decrease the rate of flow of water and the rate of heat transfer.

Two general groups of microorganisms are involved in the deterioration of protein and carbohydrate materials and in the development of slime in industrial water supplies. These are bacteria and fungi, particularly as represented by fungi of the mold type. It is well recognized that these two groups of organisms are quite different in their reaction to various toxic chemicals, and that they characterize the range in variation encountered sufficiently to include the results for other organisms, such as algae which also are encountered in industrial water supplies.

It has been proposed to react an organic mercury containing product of the type RHgX in which R is a non-ionic radical with a phenol of the class of pentachlorophenol and its salts to produce a product for the control of blue staining fungi and mold on green lumber. Further it has been proposed to use ethyl mercuric trichlorophenolate as a bactericide. While such products are effective for various applications, we have found that there are distinct advantages for many industrial applications to the use of aromatic mercury compounds with the isomeric trichlorophenols and their salts. Our invention involves the use only of organic mercury compounds of the type RHgX in which R is an aromatic or heterocyclic radical because of the generally lower toxicity of such compounds to humans. We have discovered that a mixture of organic mercury compounds of this type with the isomeric trichlorophenols and their salts is synergistic against a microflora composed of both bacteria and mold fungi and can be used at lower concentrations to inhibit the growth of the microfloro as a whole with the result that control is obtained at a lower cost. Moreover, we have discovered that the isomeric trichlorophenols or their salts are particularly suitable for use in such mixtures in comparison to other chlorinated phenols, such as tetrachlorophenol and pentachlorophenol. In addition to the generally higher toxicity of trichlorophenols to mold fungi, we have found that they are particularly suitable for use in the combination because they are adsorbed to a smaller extent by wood pulp and a number of types of organic matter. The higher solubility of the trichlorophenol in water also makes it possible to retain a higher concentration of these chemicals in closed pulp and paper and other systems which are sufficiently acid to convert alkali metal salts of the chlorinated phenols to the free phenols.

Mercury compounds of the type RHgX will react with alkali metal salts of the isomeric trichlorophenols and our invention contemplates such reaction to varying degrees as well as the simple mixture of the components. The primary type of product of the reaction insofar as we have been able to ascertain is a mercury containing compound of the type RHgX in which R is the organic radical of the mercury compound or compounds used in the mixture and X is an anion from trichlorophenol. The reaction product thus seems to be an organic mercury trichlorophenolate.

We have found that a wide range of aromatic organic mercury compounds of the type RHgX can be successfully employed in realizing the benefits we have discovered in the use of the combination of these compounds with the isomeric trichlorophenols and their salts. The organic radical R may be phenyl, pyridyl, or other aromatic or heterocyclic groups. Although we prefer a radical containing one or more polar groups, such as a hydroxyphenyl, because of its greater water solubility, we desire it to be understood that we are not limited to such radicals.

The relative proportions of the two types of active ingredients used in our invention are not critical but we have found it desirable to employ the isomeric trichlorophenols and their salts in quantities between 5 to 25 times the amount of mercury in the mercury containing compound.

Following are some examples of the use of our invention:

Example I

The addition of 0.01 to 0.1 lb. of hydroxyphenylmercuric acetate or 0.01 to 0.1 lb. of phenylmercuric acetate and 0.05 to 0.5 lb. of potassium 2,4,6-trichlorophenolate per ton of dry pulp effectively controls slime in paper manufacturing operations.

Example II

Sliming, molding, and general degradation of pulp lap stock is controlled to a satisfactory degree for the normal periods of storage by uniformly spraying both sides of the lap with a solution of such concentration to give a retention of 0.05 to 0.15 lb. of hydroxyphenylmercuric acetate or 0.05 to 0.15 lb. of phenylmercuric acetate and 0.25 to 0.75 lb. of potassium 2,4,6-trichlorophenolate per ton of dry pulp.

Example III

Effective control of microorganisms in pulp stock held in process is obtained by the addition of 0.05 to 0.10 lb. of hydroxyphenylmercuric acetate or 0.05 to 0.10 lb. of phenylmercuric acetate and 0.25 to 0.50 lb. of potassium 2,4,6-trichlorophenolate per ton of dry pulp.

Example IV

Biological degradation of woolen felts can be reduced by thoroughly saturating them when shutting down with a solution containing 0.05 to 0.15 lb. of hydroxyphenylmercuric acetate or 0.5 to 0.15 lb. of phenylmercuric acetate and 0.25 to 0.75 lb. of potassium 2,4,6-trichlorophenolate per 100 gallons of water.

Example V

Biological degradation of starch coating and sizing materials can be controlled by the addition of 0.02 to 0.06 per cent of hydroxyphenylmercuric acetate or 0.02 to 0.06 per cent of phenylmercuric acetate and 0.1 to 0.3 per cent of potassium 2,4,6-trichlorophenolate based on the dry weight of these materials.

Example VI

Biological degradation of soybean protein, casein protein and similar materials can be controlled by the addition of 0.04 to 0.1 per cent of hydroxyphenylmercuric acetate or 0.04 to 0.1 per cent of phenylmercuric acetate and 0.2 to 0.5 per cent of potassium 2,4,6-trichlorophenolate based on the dry weight of these materials.

Example VII

Growth of microorganisms in industrial cooling water can be controlled by the addition of 0.5 to 2.5 parts of hydroxyphenylmercuric acetate or 0.5 to 2.5 parts of phenylmercuric acetate and 2.5 to 12.5 parts of potassium 2,4,6-trichlorophenolate per million parts of water.

We have prepared the following new arylmercuric trichlorophenolates by reacting equimolar amounts of the arylmercuric acetates or chlorides and 2,4,6-trichlorophenolates in water: ortho hydroxyphenylmercuric 2,4,6-trichlorophenolate; para hydroxyphenylmercuric 2,4,6-trichlorophenolate; phenylmercuric 2,4,6-trichlorophenolate; pyridylmercuric 2,4,6-trichlorophenolate. The relatively insoluble arylmercuric trichlorophenolates precipitate in yields in excess of 80 per cent of theoretical. Several of the compounds were purified by recrystallization from water, alcohol or acetone and their composition confirmed by analyses, the results of which are given in the following table with melting points for the pure compounds.

COMPOUND

| RHg | X |
|---|---|
| Phenylmercuric | 2,4,6-trichlorophenolate. |
| o-Hydroxyphenylmercuric | Do. |

ANALYSES

| M. P., ° C. | Mercury | | Chlorine | |
|---|---|---|---|---|
| | Found | Calc'd. | Found | Calc'd. |
| 197 | 42.57 | 42.23 | 22.17 | 22.43 |
| Sint. 292 | 40.64 | 40.93 | 21.76 | 21.72 |

Having thus described our invention, what we claim as new and desire to secure by Letters Patent is:

1. Industrial aqueous paper stock containing carbohydrate material subject to damage by slime producing organisms said stock including an organic mercury compound selected from the group consisting of o-hydroxy phenyl mercuric, p-hydroxy phenyl mercuric, phenyl mercuric, and pyridyl mercuric acetates and chlorides and alkali metal salt of 2,4,6-trichlorophenol, the amount of mercury compound being from about 0.01 to 0.15 part by weight, and the amount of salt being from about 0.05 to 0.75 part by weight, both per 2000 parts by weight of dry paper stock.

2. The method of controlling deterioration by microflora in industrial aqueous paper stock containing at least one material of carbohydrate character subject to damage by slime producing bacterial and fungal microorganisms which comprises adding to said stock an organic mercury compound selected from the group consisting of o-hydroxy phenyl mercuric, p-hydroxy phenyl mercuric, phenyl mercuric, and pyridyl mercuric acetates and chlorides and an alkali metal salt of 2,4,6 trichlorophenol, the amount of mercury compound being from about 0.01 to 0.15 part by weight and the amount of salt being from about 0.05 to 0.75 part by weight, both per 2000 parts by weight of dry paper stock.

3. The method as set forth in claim 2 in which the organic mercury compound is a phenyl mercuric compound.

4. The method as set forth in claim 3 in which the organic mercury compound is phenylmercuric acetate.

5. The method as set forth in claim 3 in which the organic mercury compound is a hydroxyphenylmercuric compound.

6. The method as set forth in claim 3 in which the organic mercury compound is hydroxyphenyl mercuric acetate.

7. The method as set forth in claim 3 in which the organic mercury compound is o-hydroxyphenylmercuric compound.

8. The method as set forth in claim 3 in which the organic mercury compound is p-hydroxyphenylmercuric compound.

9. The method as set forth in claim 3 in which the organic mercury compound is an aromatic mercury chloride.

10. The method as set forth in claim 3 in which the organic mercury compound is a pyridyl mercury compound.

(References on following page)

References Cited in the file of this patent

UNITED STATES PATENTS

| Number | Name | Date |
|---|---|---|
| 2,070,080 | Hart | Feb. 9, 1937 |
| 2,304,013 | Norton | Dec. 1, 1942 |
| 2,331,268 | Flenner | Oct. 5, 1943 |
| 2,400,677 | Allen | May 21, 1946 |
| 2,429,086 | Andersen | Oct. 14, 1947 |

OTHER REFERENCES

"Phenyl Mercurics," a pamphlet published by Metalorganics, Inc., (1947), pages 17–20.